J. P. Kettell.
Ironing Hats.

No. 34,838.   Patented April 1, 1862.

Witness
John C. Otis
James H. Kettell

Josra P Kettell

UNITED STATES PATENT OFFICE.

JOHN P. KETTELL, OF WORCESTER, MASSACHUSETTS.

IMPROVEMENT IN HAT SHELL-IRONS.

Specification forming part of Letters Patent No. 34,838, dated April 1, 1862.

*To all whom it may concern:*

Be it known that I, JOHN P. KETTELL, of Worcester, in the county of Worcester and State of Massachusetts, have invented a new and useful Improvement on a Shell-Iron for Ironing Hats; and I do hereby declare that the following is a full and exact description.

The improvement which I claim consists of a change of form of the shell hat-iron, so as to adapt it to the use of ironing the upper side of a hat-brim that is curled. The hat-iron as now used will not (on account of the form) iron the brim without first taking out the curl, so that the face of the iron will bear upon it, while with my improved iron the brim, as well as the whole hat, can be ironed with the brim curled.

My improved irons can be heated in the usual way of heating shell-irons, by inserting heated plugs, and is also adapted to being heated by gas.

Figure 1:
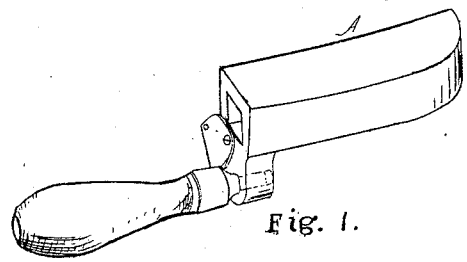
Figure 2:
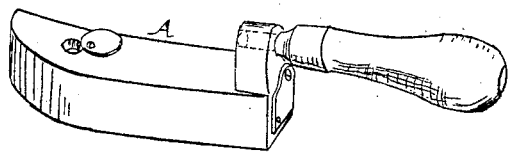
Figure 3:
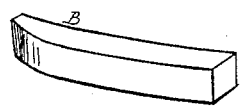

The particular form which I claim as my improvement is the curve, as represented by the line A in Figures 1 and 2 of the accompanying drawings, and also by line B in Fig. 3, which represents the plug or heater.

This improvement will be of great utility to retail hat dealers by enabling them to smooth and iron and give luster to all parts of a hat with the same iron, which cannot be done by any iron now in use.

What I claim, and desire to secure by Letters Patent, is—

A hat shell-iron constructed substantially as described.

JOHN P. KETTELL.

Witnesses:
    JOHN C. OTIS,
    I. F. KETTELL.